(12) United States Patent
Tamai et al.

(10) Patent No.: US 6,459,170 B1
(45) Date of Patent: Oct. 1, 2002

(54) ON-BOARD ELECTRIC POWER SUPPLY SYSTEM

(75) Inventors: Yasuhiro Tamai, Shizuoka (JP); Takashi Gohara, Shizuoka (JP); Yoshinori Ikuta, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 86 days.

(21) Appl. No.: 09/642,670

(22) Filed: Aug. 22, 2000

(30) Foreign Application Priority Data

Sep. 3, 1999 (JP) .......................................... 11-250596

(51) Int. Cl.$^7$ ................................................. H02J 3/32
(52) U.S. Cl. ............................ 307/48; 307/28; 307/139
(58) Field of Search ............................... 307/9.1, 10.1, 307/11, 28, 43, 48, 75, 112, 116, 125, 87, 139, 141, 141.4; 320/103, 104; 322/7, 89, 28, 90

(56) References Cited

U.S. PATENT DOCUMENTS 5,111,189 A * 5/1992 Yeh ............................. 324/133
5,334,926 A * 8/1994 Imaizumi ..................... 307/16
5,418,401 A * 5/1995 Kaneyuki ................... 307/10.1
5,793,189 A * 8/1998 Kawaguchi et al. ........ 320/125

FOREIGN PATENT DOCUMENTS

JP 60-62666 A * 4/1985
JP 5-278535 10/1993 ........... B60R/16/02

OTHER PUBLICATIONS

Clippedimage=JP360062666A, English Translation of Abstract of JP–60–62666A, Pub Date Apr. 10, 1985.*
Patent Abstract of Japan 05278535 Oct. 26, 1993.

* cited by examiner

Primary Examiner—Brian Sircus
Assistant Examiner—Sharon Polk
(74) Attorney, Agent, or Firm—Sughrue Mion, PLLC

(57) ABSTRACT

A CPU (31) captures an on control signal for low-voltage loads (26 to 28) in LAN multiplex transmission, controls low-voltage switching devices (36 to 38) to be turned on in order to supply a power to the low-voltage loads (26 to 28), and performs a DC supply from a low-voltage battery (29) to the low-voltage loads (26 to 28). In this case, immediately after the on control signal for the low-voltage loads (26 to 28) is captured, the CPU (31) controls a voltage converter (32) which is not operating, so as to be activated, thereby performing a DC supply to the low-voltage battery (29) and the low-voltage loads (26 to 28).

18 Claims, 4 Drawing Sheets

FIG. 2 (A) SW SIGNAL
FIG. 2 (B) LOAD CURRENT
FIG. 2 (C) BATTERY VOLTAGE
FIG. 2 (D) OUTPUT VOLTAGE OF VOLTAGE CONVERTER

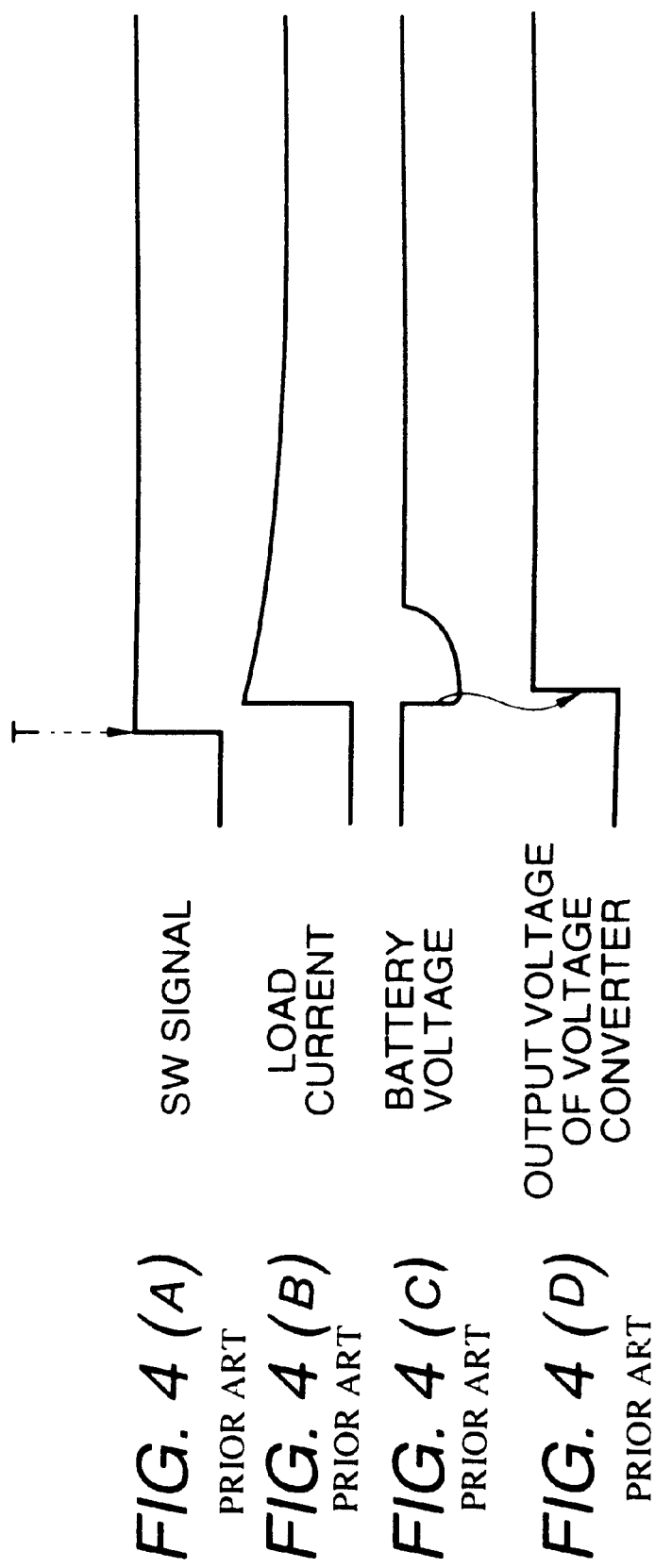
FIG. 4 (A) PRIOR ART
FIG. 4 (B) PRIOR ART
FIG. 4 (C) PRIOR ART
FIG. 4 (D) PRIOR ART

ON-BOARD ELECTRIC POWER SUPPLY SYSTEM

BACKGROUND OF THE INVENTION

The present invention relates to an on-board electric power supply system which supplies DC power to various loads in an automobile, and particularly to an on-board electric power supply system which reduces the voltage variation in load driving by application of a predetermined voltage and supply of a desired current (hereinafter, often referred to as a DC supply) from a battery.

RELATED ART

In a recent DC power supply system for an automobile, a voltage converter (DC/DC converter) is employed in order to stably supply 12-volt DC (hereinafter, often referred to as a low-voltage system) which is conventionally used for lamps, vehicle-mounted electronic apparatuses, etc. Furthermore, a DC supply for a blower motor which efficiently operates at a relatively high voltage, and a supply of, for example, 48-volt DC at which a large power supply can be performed by using a thin cable conductor (hereinafter, such a DC supply is often referred to as a high-voltage system) are known (for example, Japanese unexamined Patent Publication Hei. 5-278535 "Electric power supply system for automotive vehicle").

FIG. 3 is a block diagram showing the configuration of a conventional on-board electric power supply system having such low- and high-voltage systems.

In the on-board electric power supply system, a DC voltage from a alternator 2 charges a battery 3 of a high-voltage system (for example, 48 volts). The DC voltage of the high-voltage system is supplied to a blower motor 4 via a switch SW1, and also to a voltage converter 5 so as to be subjected to low-voltage conversion to 12-volt DC. The converted low voltage charges a battery 6 of a low-voltage system (12 volts).

The low voltage of the battery 6 is supplied to a load 10 (a switch SW2 and a lamp 10a, a vehicle speed sensor 10b, a switch SW3 and a bleeder resistor R, and the like). In the on-board electric power supply system, the voltage and the current of the battery 6 are detected by a voltage detector 7 and a current detector 8. Only when the voltage of the battery 6 is lowered to a level below a specified value, particularly, a controller 9 activates the voltage converter 5 to charge the battery 6. Namely, the current consumption can be reduced in accordance with the operation/inoperation of the voltage converter 5.

A vehicle that includes such a DC supply is performed with an electric junction box of a multi-layer structure in which circuit boards are stacked and harness connectors, fuses for loads, and switching devices are incorporated so as to realize electrical connection. The electric junction box provides a DC supply to the loads such as lamps, motors, and vehicle-mounted electronic apparatuses (for example, an audio apparatus, a navigation apparatus, and a television receiver), simplifies the connection wiring using concentrated wiring, and facilitates maintenance works.

In an electric junction box, a well-known configuration may be employed in which a CPU for executing multiplex transmission (for example, time division multiple access (TDMA)) using a local area network (LAN) is incorporated in order to implement DC branching and recent complicated vehicle controls (for example, various controls on an increased number of vehicle-mounted electronic apparatuses, and an elaborated air-fuel ratio control). The CPU captures various multiplex signals (for examples, signals instructing on/off operations and function change over of vehicle-mounted electronic apparatuses), and switches over the switching devices, thereby controlling activation and inactivation (on and off) of each load.

FIG. 4 is a timing chart illustrating the operation of the conventional on-board electric power supply system.

As shown in (a) of FIG. 4, the CPU captures an operation signal (SW signal) at a time T, and executes an ON control on a switching device for the corresponding load channel. When a large inrush current to a lamp or the like is generated as a result of the ON control as shown in (b) of FIG. 4, a DC voltage (hereinafter, often referred to as a battery voltage) which is to be supplied from a battery to a load is temporarily dropped by the large inrush current when power supply to the load is activated. After a delay from the voltage drop, an activation control for supplying a DC output from the voltage converter 5 to the battery is executed so as to compensate for the voltage drop. Therefore, the voltage drop shown in (c) of FIG. 4 may cause the illumination of a lamp to be lowered for a moment, or an audio output to be temporarily reduced.

As described above, the on-board electric power supply system of the conventional art example has a defect that, when the power supply in, particularly, a 12-V low-voltage system is turned on, voltage variation of a relatively large level is generated as a result of driving of a load, so that the illumination of a lamp is lowered for a moment or an audio output is temporarily reduced.

SUMMARY OF THE INVENTION

The invention has been conducted in order to solve the problem of the related art. It is an object of the invention to provide an on-board electric power supply system in which voltage variation due to driving of a load in a DC supply from a battery upon turning on of a power supply can be accurately suppressed to a minimum level, overcharge can be prevented from occurring, and power consumption can be reduced.

In order to attain the object, the on-board electric power supply system of the invention is configured so that the system comprises: a battery which performs a DC power supply at a predetermined voltage and a required current to plural loads; voltage converting means for performing a DC power supply to the battery while converting an input DC voltage; and controlling means for, immediately after an ON control signal instructing activation of a load is captured, performing activation of the voltage converting means.

Furthermore, the on-board electric power supply system of the invention is configured so that the system comprises: a battery which performs a DC power supply at a predetermined voltage and a required current to plural loads; voltage converting means for performing a DC power supply to the battery while converting an input DC voltage; and controlling means for, immediately after an ON control signal instructing activation of a load is captured, performing a DC power supply corresponding to prestored information of power consumption of the load which is instructed to be activated, by activating and controlling the voltage converting means.

Preferably, the controlling means comprises timer means, the timer means counts a time elapsed after a control of turning off a load, the controlling means estimates an inrush current from a temperature state of the load at the elapsed time, and a DC supply corresponding to the estimated inrush current is performed from the voltage converting means to the load under a control of the controlling means.

In the thus configured on-board electric power supply system of the invention, a control of activating the voltage converting means is performed immediately after an ON control signal instructing activation of a load is captured. Together with the activation control, a DC supply corresponding to the prestored power consumption of the load is performed. As a result, voltage variation due to driving of a load in a DC supply from the battery upon turning on a power supply, i.e., an inrush current at the start of activation of the load can be accurately suppressed to a minimum level.

In the on-board electric power supply system of the invention, a DC output is performed on the basis of the temperature state of a load which corresponds to the time elapsed after a control of turning off the load. When the temperature of the load is low, for example, the resistance is low so that the inrush current of the load is large.

The controlling means controls the voltage converting means so as to perform a DC supply corresponding to the low temperature. As a result, it is not required to perform the charge control on the battery in excess of that needed, so that overcharge can be prevented from occurring and power consumption can be reduced.

In the case where the load is a lamp or the like, particularly, an inrush current is remarkably changed with respect the temperature state, and a large inrush current flows when the temperature is low. When an ON/OFF control or the like is performed, therefore, the duty ratio in an initial state is largely different from that in a state where the lamp is warmed.

BRIEF DESCRIPTION OF THE DRAWINGS

FIG. 4 is a timing chart illustrating the operation of the conventional on-board electric power supply system.

DETAILED DESCRIPTION OF THE INVENTION

A preferred embodiment of the on-board electric power supply system of the invention will be described in detail with reference to the accompanying drawings.

Figure 1:
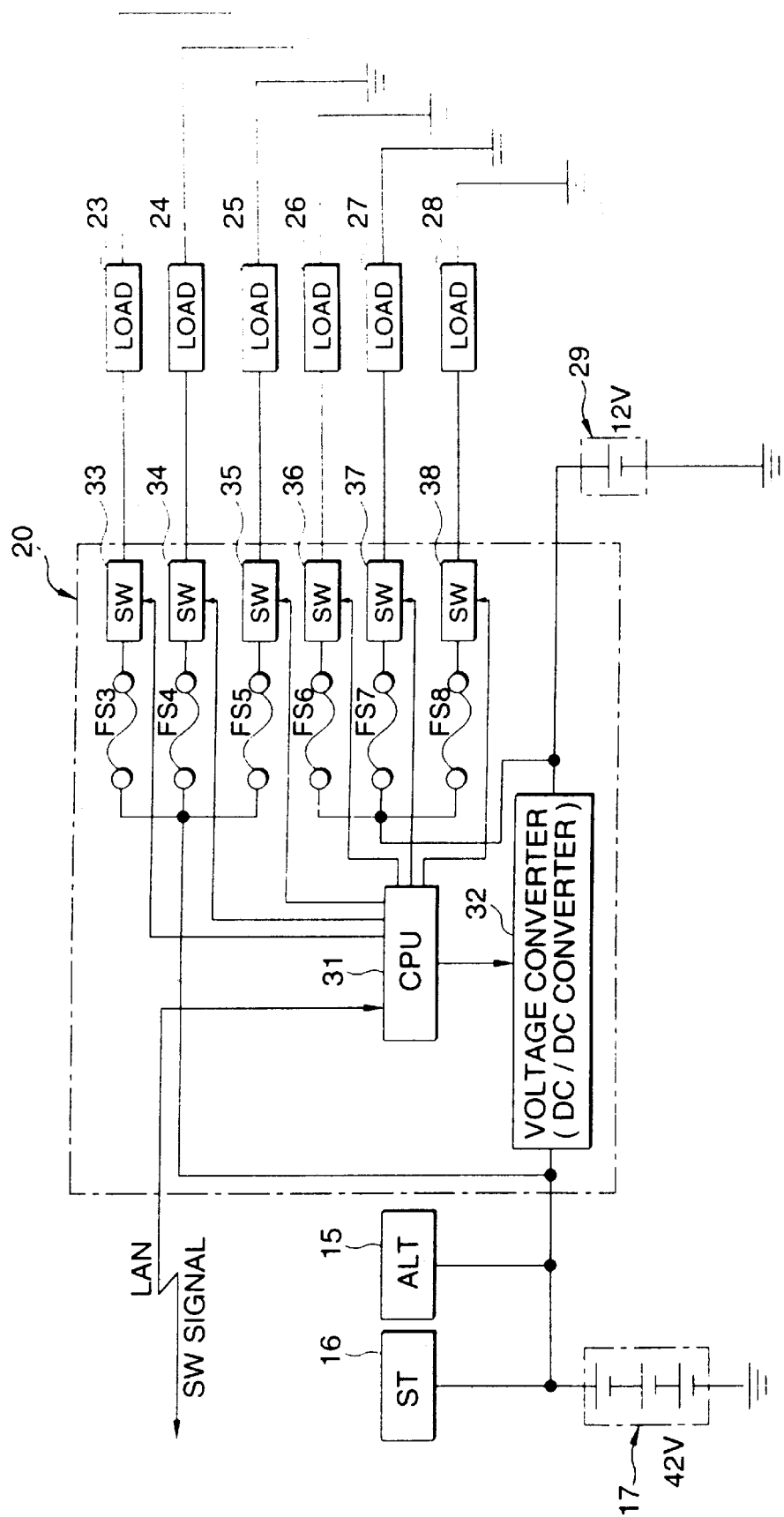
FIG. 1 is a block diagram showing the configuration of an embodiment of the on-board electric power supply system of the invention.

FIG. 1 is a block diagram showing the configuration of an embodiment of the on-board electric power supply system of the invention.

The on-board electric power supply system has a starter (ST) 15 for starting an engine, and an alternator (ALT) 16 which is mounted on the engine to perform a supply of 42-volt DC (hereinafter, often referred to as a high-voltage system). The voltage is not particularly restricted to 42 volts, or is adequately determined depending on a battery to be used, and the operation voltages of loads.

In the on-board electric power supply system, a high-voltage battery 17 for supplying 42 volts, and an electric junction box 20 which is configured as described later are disposed. Furthermore, high-voltage loads 23, 24, and 25 to which a 42-volt DC is supplied via the electric junction box 20, low-voltage loads 26, 27, and 28 to which a 12-volt DC (hereinafter, often referred to as a low-voltage system) is supplied, and a low-voltage battery 29 for 12 volts are disposed. For example, the high-voltage loads 23 to 25 include a blower motor which efficiently operates at a relatively high voltage, and the low-voltage loads 26 to 28 include lamps of ratings which are conventionally frequently used, and vehicle-mounted electronic apparatuses such an audio apparatus, a navigation apparatus, and a television receiver.

The electric junction box 20 includes: a CPU 31 serving as controlling means for capturing an SW signal in LAN multiplex transmission, for executing an ON/OFF switching control on the high-voltage loads 23 to 25 and the low-voltage loads 26 to 28, and for executing "control corresponding to the invention" which will be described later in detail; and a voltage converter (DC/DC converter) 32 serving as voltage converting means for converting 42 volts from the high-voltage battery 17 into 12 volts for the low-voltage system. High-voltage fuses FS3, FS4, and FS5 which are respectively connected in series to power supply channels for the high-voltage loads 23 to 25, and high-voltage switching devices (SW) 33, 34, and 35 which are subjected to the ON/OFF switching control by the CPU 31 are disposed In the electric junction box 20.

Low-voltage fuses FS6, FS7, and FS8 which are respectively connected in series to power supply channels for the low-voltage loads 26 to 28, and low-voltage switching devices (SW) 36, 37, and 38 which are subjected to the ON/OFF switching control by the CPU 31 are disposed in the electric junction box 20.

The voltage converter 32 performs low-voltage conversion from 42 volts to 12 volts, and a control of a DC supply by the CPU 31 that is "control corresponding to the invention" which will be described later. Therefore, the voltage converter 32 has the same function as an alternator which is used in a 12-V low-voltage system of the conventional art. The voltage converter 32 can include a dropper control type or chopper type DC/DC converter based on a transistor and serving as a well-known series regulator. Alternatively, an inverter type DC/DC converter in which the input and the output can be insulated from each other may be used. In the embodiment, the type of the converter is not particularly restricted. The voltage converter 32 may be selected in consideration of the power consumption of the low-voltage loads 26 to 28, and particularly the control of the DC supply by the CPU 31 that is "control corresponding to the invention" which will be described later in detail.

The operation of the embodiment will be described.

When the engine is to be stared, the 42-volt DC of the high-voltage battery 17 is supplied to the starter (ST) 15. During an idling operation, the 42-volt DC of the high-voltage battery 17, and the DC from the alternator 16 are supplied to the electric junction box 20. During a high-speed operation, the DC from the alternator 16 is supplied to the high-voltage battery 17 and the electric junction box 20.

The 42-volt DC of the high-voltage battery 17 is supplied to the electric junction box 20. In the electric junction box 20, the 42-volt DC output from the high-voltage battery 17 is supplied to the high-voltage loads 23 to 25 via the high-voltage fuses FS3 to FS5, and the high-voltage switching devices 33 to 35 which are made conductive by the on control of the CPU 31. The 42-volt DC output from the high-voltage battery 17 is input into the voltage converter 32 in the electric junction box 20, and converted and stabilized into a lower voltage or 12 volts by the voltage converter 32. The 12-Volt DC is supplied to the low-voltage loads 26 to 28 via the low-voltage fuses FS6 to FS8, and the low-voltage switching devices 36 to 38 which are made conductive by the ON control of the CPU 31.

The CPU 31 controls the charging operation on the low-voltage battery 29. For example, a voltage detector and a current detector are used to detect the voltage and the current, and a control of activating the voltage converter 32 is performed as required to charge the low-voltage battery 29. The illustration and description of the control is omitted.

Figure 2:
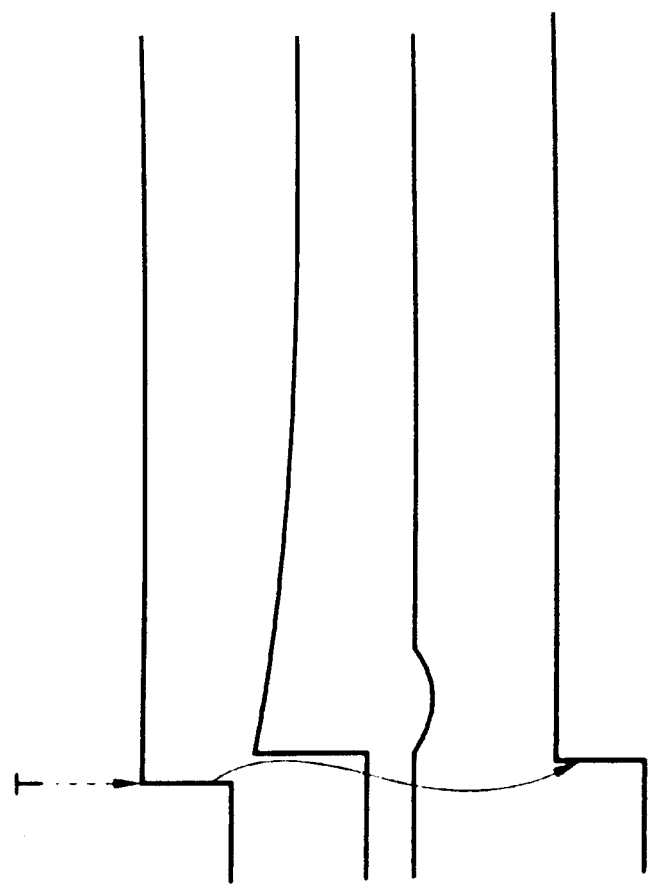
FIG. 2 is a timing chart illustrating the operation of the embodiment.
Figure 3:
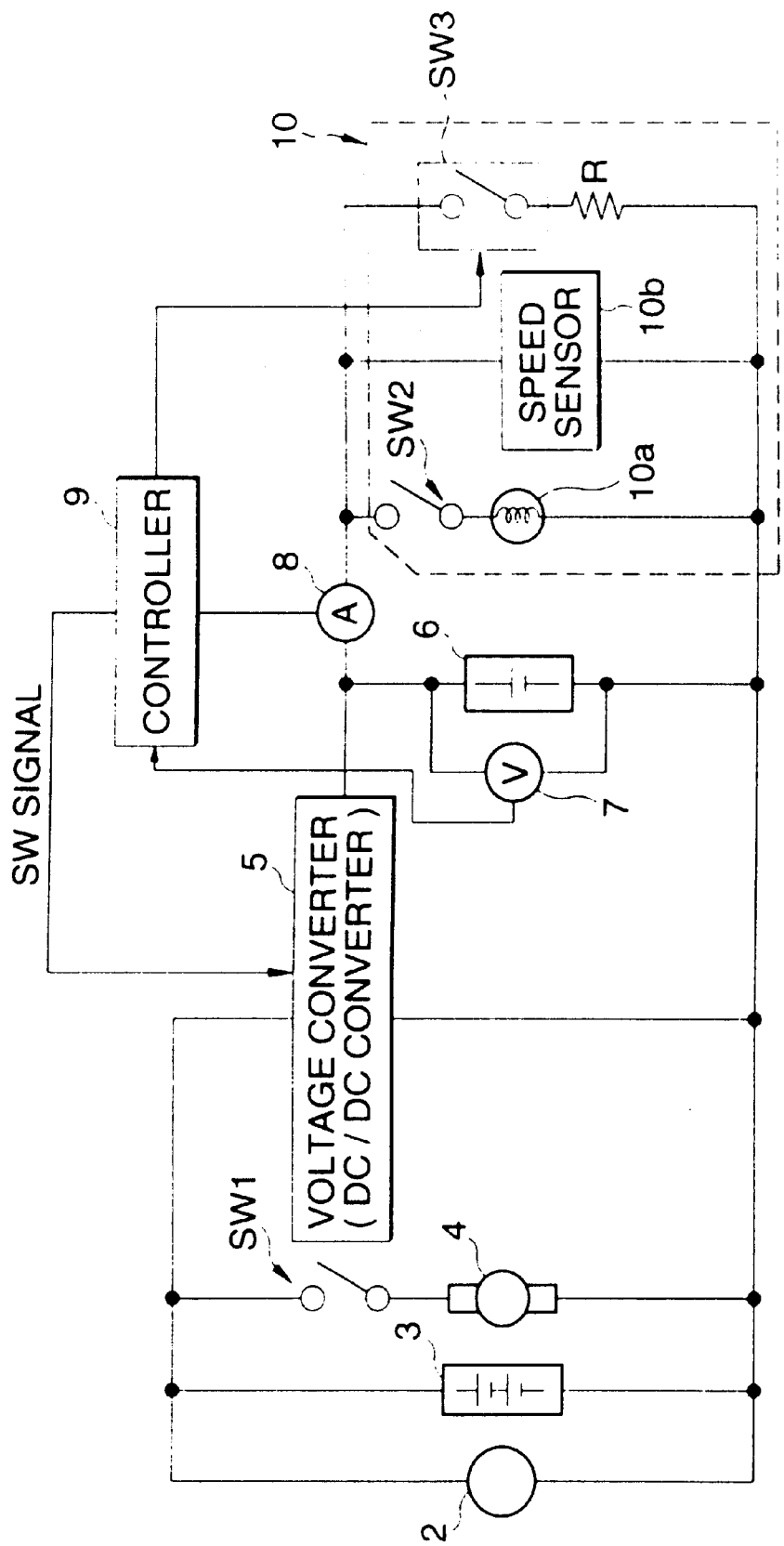
FIG. 3 is a block diagram showing the configuration of a conventional onboard electric power supply system.

FIG. 2 is a timing chart illustrating the control of the DC supply by the CPU 31 that is "control corresponding to the invention."

The control of the DC supply by the CPU 31 from the voltage converter 32 to the low-voltage loads 26 to 28 is configured by following controls (A), (B), and (C):

(A) activation control in response to capture of an operation signal;

(B) control corresponding to power consumption of a load; and (C) control corresponding to the temperature of a load.

(A) Activation Control in Response to Capture of an Operation Signal (1) As shown in FIG. 2 (A), at the time T, the CPU 31 captures the operation signal (SW signal) in LAN multiplex transmission, namely, ON control signals for the low-voltage loads 26 to 28. Hereinafter, an ON control of the low-voltage load 26 will be described.

(2) As shown in FIG. 2 (B), immediately after the ON control signal for the low-voltage load 26 is captured, the CPU 31 controls the voltage converter 32 which is not operating, so as to be activated, thereby performing a DC supply from the voltage converter 32 to the low-voltage battery 29.

(3) In order to supply a power to the low-voltage load 26, the CPU 31 controls the low-voltage switching device 36 to be turned on, whereby a DC supply is performed from the low-voltage battery 29 to the low-voltage load 26. Alternatively, the ON control on the low-voltage switching device 36 may be performed simultaneously with the control of activating the voltage converter 32.

The activation control on the voltage converter 32 is performed by the CPU 31 in the following manner. In the case where the voltage converter 32 is a dropper control type or chopper type DC/DC converter (series regulator) based on a transistor, the activation is realized by applying an ON voltage to the base of the transistor, or changing the setting so as to lower the bias voltage. Similarly, the activation control in the case where the voltage converter 32 is an inverter type DC/DC converter is performed.

As a result, as shown in FIG. 2(B) and FIG. 2(C), the voltage converter 32 is activated before the voltage of the low-voltage battery 29 is temporarily dropped by the large inrush current at turning on of the power supply to the low-voltage load 26, so that the output voltage of the voltage converter 32 can be supplied to the low-voltage load 26 and the low-voltage battery 29. As shown in FIG. 2(C), therefore, the voltage drop of the low-voltage battery 29 can be suppressed to a minimum level. When the power supply to the low-voltage load 26 is turned on, consequently, with respect to the other low-voltage loads 27 and 28 in addition to the low-voltage load 26, for example, the illumination of a lamp is not temporarily lowered, or an audio output is not temporarily reduced.

(B) Control Corresponding to Power Consumption of a load (1) The CPU 31 previously stores data of power consumption of each of the low-voltage loads 26 to 28, into a memory which is not shown.

(2) As shown in FIG. 2(A), at the time T, the CPU 31 captures the ON control signal for the low-voltage load 26 in LAN multiplex transmission.

(3) The CPU 31 captures the power consumption data of the low-voltage load 26 from the memory which is not shown, and recognizes the data.

(4) As shown in FIG. 2(D), immediately after the ON control signal for the low-voltage load 26 is captured, the CPU 31 controls the voltage converter 32 which is not operating, so as to be activated, and controls the operation of the voltage converter 32 so as to correspond to the power consumption of the low-voltage load 26.

(5) In order to supply a power to the low-voltage load 26, the CPU 31 controls the low-voltage switching device 36 to be turned on. Alternatively, the ON control on the low-voltage switching device 36 may be performed simultaneously with the control of activating the voltage converter 32.

The control corresponding to power consumption of the load and on the voltage converter 32 is performed in the following manner. In the case where the voltage converter 32 is a dropper control type or chopper type DC/DC converter (series regulator) based on a transistor, the base bias voltage of the transistor is set to be low, thereby lowering the series resistance of the transistor. This causes the voltage converter 32 to perform a DC supply for suppressing the voltage drop of the low-voltage battery 29 to a minimum level, i.e., to apply a predetermined voltage and supply a required current. In the case where the voltage converter 32 is a self-excited or separately excited (for example, PWM control) inverter type DC/DC converter, the CPU 31 produces a base drive control signal corresponding to power consumption of the low-voltage load 26, and outputs the signal to the voltage converter 32, whereby the switching device of the DC/DC converter is controlled so as to perform a DC supply at which the output voltage of the low-voltage battery 29 is not dropped.

As a result, an output voltage which corresponds to each of the low-voltage loads 26 to 28 can be supplied from the voltage converter 32 to the low-voltage load 26 and the low-voltage battery 29. As shown in FIG. 2(B) and FIG. 2(C), for each of the low-voltage loads 26 to 28, therefore, the voltage drop of the low-voltage battery 29 due to an inrush current can be suppressed to a minimum level. When turning on of the power supply to the low-voltage load 26, consequently, with respect to the other loads 27 and 28, for example, the momentary reduction of illumination of a lamp, and that of an audio output or the like can be further decreased.

(C) Control Corresponding to the Temperature of a Load

In each of the low-voltage loads 26 to 28, its current consumption is largely varied depending on the temperature. The temperature change can be obtained in the term of the elapsed time, and the control by the CPU 31 can be performed in consideration of the inrush current in the ON control. In this case, a timer circuit is disposed in the CPU 31 to count the time after a control of turning off the low-voltage loads 26 to 28 which have been operating as a result of the previous ON control. The CPU 31 estimates the level of an inrush current from the lowered temperature state of the low-voltage loads 26 to 28 due to the elapsed time.

In the next ON control on the low-voltage loads 26 to 28, the CPU 31 controls the voltage converter 32 so as to correspond to the estimated value of an inrush current. This control can be performed in a similar manner as "(B) Control corresponding to power consumption of a load" described above. Under the control of the CPU 31, the voltage converter 32 performs a DC supply corresponding to an inrush current according to the temperature state of the low-voltage loads 26 to 28, namely, applies a predetermined voltage at which the voltage drop of the low-voltage battery 29 is suppressed to a minimum level, to the low-voltage loads 26 to 28, and supplies a required current to the loads.

In this case, it is not required to perform the charge control using the voltage and current detectors, in excess of that needed. As a result, overcharge on the low-voltage battery 29 can be prevented from occurring and power consumption can be reduced.

As apparent from the above description, in the on-board electric power supply system of the invention, a DC supply based on the low-voltage conversion is performed on a battery immediately after an on control signal instructing activation of a load is captured. Together with the activation control, a DC supply corresponding to the previously stored power consumption of the load is performed.

As a result, voltage variation due to driving of a load in a DC supply from the battery at turning on of a power supply, i.e., an inrush current in which the current is increasing can be accurately suppressed to a minimum level.

In the on-board electric power supply system of the invention, a DC output is performed on the basis of the temperature state of a load which corresponds to the time elapsed after a control of turning off the load. When the temperature of the load is low, for example, the inrush current of the load is large. In accordance with this, a DC supply based on the low-voltage conversion is performed on a battery.

As a result, it is not required to perform the charge control on the battery in excess of that needed, so that overcharge can be prevented from occurring and power consumption can be reduced.

What is claimed is:

1. An on-board electric power supply system comprising:
   a battery which supplies a first DC power of a predetermined voltage and required current to at least one load in response to a respective ON control signal;
   a voltage converting mechanism which converts an input DC voltage to a second DC power and supplies said second DC power to said battery;
   a controlling mechanism activating said voltage converting mechanism immediately after said control mechanism receives said ON control signal.

2. An on-board electric power supply system according to claim 1, wherein said controlling mechanism comprises a timer mechanism, said timer mechanism counts an elapsed time since a control of turning off said at least one load, and estimates an inrush current from a temperature state of said at least one load at said elapsed time, said controlling mechanism controls said voltage converting mechanism to supply said second DC power corresponding to said inrush current to said at least one load.

3. An on-board electric power supply system according to claim 1, wherein said voltage converting mechanism supplies said second DC power to said at least one load in response to said respective ON control signal.

4. An on-board electric power supply system according to claim 1, wherein first voltage of said first and second DC power is lower than second voltage of said input DC voltage.

5. An on-board electric power supply system according to claim 1, wherein said controlling mechanism outputs said ON control signal to activate said at least one load.

6. An on-board electric power supply system comprising:
   a battery which supplies a first DC power of a predetermined voltage and required current to at least one load in response to a respective ON control signal;
   a voltage converting mechanism which converts an input DC voltage to a second DC power and supplies said second DC power to said battery;
   a controlling mechanism which activates said voltage converting mechanism immediately after said controlling mechanism receives an ON control signal, and controls said voltage converting mechanism such that said second DC power corresponds to previously stored information of power consumption of said at least one load instructed to be activated.

7. An on-board electric power supply system according to claim 6, wherein said controlling mechanism comprises a timer mechanism, said timer mechanism counts an elapsed time since a control of turning off said at least load, and estimates an inrush current from a temperature state of said at least one load at said elapsed time, said controlling mechanism controls said voltage converting mechanism to supply said second DC power corresponding to said inrush current to said at least one load.

8. An on-board electric power supply system according to claim 6, wherein said voltage converting mechanism supplies said second DC power to said at least one load in response to said respective ON control signal.

9. An on-board electric power supply system according to claim 6, wherein low voltage of said first and second DC power is lower than high voltage of said input DC voltage.

10. An on-board electric power supply system according to claim 6, wherein said controlling mechanism outputs said ON control signal to activate said at least one load.

11. An on-board electric power supply system according to claim 6, wherein said control mechanism includes a memory, said stored information is incorporated into said memory.

12. An on-board electric power supply system comprising:
    a battery which supplies a first DC power of a predetermined voltage and required current to at least one load in response to a respective ON control signal;
    a voltage converting mechanism which converts an input DC voltage to a second DC power and supplies said second DC power to said battery;
    a controlling mechanism which receives said ON control signal to selectively activate said voltage converting mechanism to supply said second DC power to said battery.

13. An on-board electric power supply system according to claim 12, wherein said controlling mechanism controls said voltage converting mechanism such that said second DC power corresponds to previously stored information of power consumption of said at least one load instructed to be activated.

14. An on-board electric power supply system according to claim 12, wherein said controlling mechanism comprises a timer mechanism, said timer mechanism counts an elapsed time since a control of turning off said load, and estimates an inrush current from a temperature state of said load at said elapsed time, said controlling mechanism controls said voltage converting mechanism to supply said second DC power corresponding to said inrush current to said at least one load.

15. An on-board electric power supply system according to claim 12, wherein said voltage converting mechanism supplies said second DC power to said at least one load in response to said respective ON control signal.

16. An on-board electric power supply system according to claim 12, wherein low voltage of said first and second DC power is lower than high voltage of said input DC voltage.

17. An on-board electric power supply system according to claim 12, wherein said controlling mechanism outputs said ON control signal to activate said at least one load.

18. An on-board electric power supply system according to claim 13, wherein said control mechanism includes a memory, said stored information is incorporated into said memory as a program.

* * * * *